United States Patent

(12) United States Patent
Isola et al.

(10) Patent No.: US 12,496,133 B2
(45) Date of Patent: Dec. 16, 2025

(54) TREATMENT PLANNING FOR FOCAL THERAPY TREATMENTS

(71) Applicant: KONINKLIJKE PHILIPS N.V., Eindhoven (NL)

(72) Inventors: Alfonso Agatino Isola, Eindhoven (NL); Marco Baragona, Eindhoven (NL); Guillaume Leopold Theodorus Frederik Hautvast, Eindhoven (NL); Christoph Neukirchen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1021 days.

(21) Appl. No.: 17/598,626

(22) PCT Filed: Apr. 1, 2020

(86) PCT No.: PCT/EP2020/059236
§ 371 (c)(1),
(2) Date: Sep. 27, 2021

(87) PCT Pub. No.: WO2020/201345
PCT Pub. Date: Oct. 8, 2020

(65) Prior Publication Data
US 2022/0176155 A1   Jun. 9, 2022

(30) Foreign Application Priority Data
Apr. 1, 2019 (EP) ..................................... 19166580

(51) Int. Cl.
*A61B 34/10* (2016.01)
*A61B 18/00* (2006.01)
(Continued)

(52) U.S. Cl.
CPC .......... *A61B 34/10* (2016.02); *A61B 18/1477* (2013.01); *A61N 5/025* (2013.01);
(Continued)

(58) Field of Classification Search
CPC ..... A61B 18/14; A61B 18/1477; A61B 34/10; A61B 2018/00577; A61N 5/025; A61N 7/02
See application file for complete search history.

(56) References Cited

U.S. PATENT DOCUMENTS 6,139,544 A * 10/2000 Mikus ................... A61B 18/02
606/23
2015/0359603 A1* 12/2015 Levy ........................ A61N 7/02
703/2

(Continued)

FOREIGN PATENT DOCUMENTS

WO   WO-2017067897 A1 *  4/2017   ............. A61B 34/10
WO        2019145211 A1     8/2019

OTHER PUBLICATIONS

Poulin, E. et al., "Adaptation of the CVT algorithm for catheter optimization in high dose rate brachytherapy", Med. Phys. (2013), vol. 40 pp. 111724.

(Continued)

*Primary Examiner* — Catherine M Voorhees

(57) ABSTRACT

The invention relates to a system for assisting in planning a focal therapy treatment of a structure (1) within a patient body (2) by applying a treatment quantity using one or more devices (4*a,b,c*) operated in one or more device positions. The system comprises a unit (10) configured to generate a constraint function representing clinical objectives relating to the treatment quantity, a selection unit (11) configured to determine, for each of at least some non-selected candidate device positions, a sum of negative derivatives of the constraint function with respect to the treatment parameter (Continued)

associated with the respective device position and to select a device position for use in the treatment based on a comparison of the determined sums, and an optimization unit (12; 408) configured to determine at least one optimized treatment parameter for the selected device position based on the constraint function.

20 Claims, 4 Drawing Sheets

(51) Int. Cl.
*A61B 18/14* (2006.01)
*A61N 5/02* (2006.01)
*A61N 7/02* (2006.01)
*A61B 18/02* (2006.01)
*A61B 18/18* (2006.01)
*A61B 34/20* (2016.01)
*A61N 5/10* (2006.01)

(52) U.S. Cl.
CPC ...... *A61N 7/02* (2013.01); *A61B 2018/00577* (2013.01); *A61B 18/02* (2013.01); *A61B 2018/0293* (2013.01); *A61B 2018/143* (2013.01); *A61B 2018/1869* (2013.01); *A61B 2034/2051* (2016.02); *A61B 2034/2065* (2016.02); *A61N 5/1027* (2013.01); *A61N 5/103* (2013.01); *A61N 2007/025* (2013.01)

(56) References Cited

U.S. PATENT DOCUMENTS

2016/0335413 A1* 11/2016 Davidson ............... G16H 50/50
2017/0209218 A1* 7/2017 Sahay .................... A61B 6/487
2020/0009403 A1 1/2020 Isola

OTHER PUBLICATIONS

Schumann, C. et al., "Interactive multi-criteria planning for radiofrequency ablation," International Journal of Computer Assisted Radiology and Surgery, vol. 10, No. 6, pp. 879-889, 2015.

Diller, K.R. et al., "Computational Infrastructure for the Real-Time Patient-Specific Treatment of Cancer," Advances in Numerical Heat Transfer, vol. 3, p. 307-344, 2009.

Lessard, E. et al., "Inverse planning anatomy-based dose optimization for HDR-brachytherapy of the prostate using fast simulated annealing algorithm and dedicated objective function", Med. Phys. (2001), vol. 28(5), pp. 773-779.

Pennes, H.H., "Analysis of Tissue and Arterial Blood Temperatures in the Resting Human Forearm", Journal of Applied Physiology, vol. 1, No. 2, pp. 93-122, 1948.

Nocedal, J. et al., "Numerical Optimization", 1999, Springer, Berlin.

International Search Report for PCT/EP2020/059236 filed Apr. 1, 2020.

* cited by examiner

TREATMENT PLANNING FOR FOCAL THERAPY TREATMENTS

CROSS-REFERENCE TO PRIOR APPLICATIONS

This application is the U.S. National Phase application under 35 U.S.C. § 371 of International Application No. PCT/EP2020//059236, filed on Apr. 1, 2020, which claims the benefit of EP patent application Ser. No. 19/166,580.1, filed on Apr. 1, 2019. These applications are hereby incorporated by reference herein.

FIELD OF THE INVENTION

The invention generally relates to the planning of a focal therapy treatment of a target structure, such as a tumor. More specifically, the invention is related to a system and a method for assisting in planning a focal therapy treatment of a structure within a patient body by applying a dose of a treatment quantity to the structure.

BACKGROUND OF THE INVENTION

In focal therapy treatments of the type described above, target structures, such as tumors, within patients' bodies are treated by applying a certain dose of a treatment quantity in order to control growth of or kill malignant cells. The dose is applied using devices which are inserted into the patient body in minimally invasive interventions and act as or hold local sources of the treatment quantity.

In thermal ablation therapy, the treatment quantity is positive or negative heat and the heat is applied by means of miniaturized ablation probes acting as heat source in order to apply positive heat or as a heat sink in order to apply negative heat. For instance, ablation probes acting as heat sources may be configured to apply an electrical current or to deliver microwave radiation or ultrasound to the tissue. Examples of probes acting as heat sinks include cryoprobes through which a refrigerant is flowing to cool tissue surrounding the cryoprobe.

In brachytherapy, the treatment quantity is an energy of ionizing radiation emitted by radiation sources placed in the vicinity of the target structure. The radiation sources may be radioactive particles which are held in certain positions—which are usually also referred to as dwell positions—in catheters inserted into the patient body.

A focal therapy treatment may be delivered in accordance with a treatment plan, which specifies the positions of the devices used in the treatment—e.g. the ablation probes or the brachytherapy catheters—and related treatment parameters. These treatment parameters may correspond to parameters for operating the ablation probes in the probe positions included in the treatment plan or specify for each position of a brachytherapy catheter the dwell positions of the respective catheter which are to be populated by radiation sources and the time intervals for holding the radiation sources in these positions, which are usually also referred to as dwell times.

The treatment plan is generated based on prescribed treatment goals such that a sufficiently high dose of the treatment quantity is applied to the target structure of the treatment and that only a small dose of the treatment quantity is applied to the healthy tissue surrounding the target structure. In order to achieve these conflicting goals in the optimal way, an optimization procedure is carried out.

SUMMARY OF THE INVENTION

It is an object of the invention to allow for a generation of a treatment plan for a focal therapy treatment such that optimized positions of treatment devices as well as optimized related treatment parameters are determined in an efficient way.

In one aspect, the invention suggests a system for assisting in planning a focal therapy treatment of a structure within a patient body by applying a treatment quantity to a body region including the structure using one or more devices, the devices being operated within the patient body in one or more device positions and in accordance with treatment parameters associated with the device positions, each device position being reached via an associated insertion point into the patient body. The system comprises (i) a constraint function generation unit configured to generate a constraint function representing clinical objectives relating to the treatment quantity, the constraint function depending upon at least one associated treatment parameter of each candidate device position of a set of candidate device positions associated with different insertion points, (ii) a selection unit configured to determine, for each of at least some non-selected candidate device positions of the set, a sum of negative derivatives of the constraint function with respect to the treatment parameter associated with the respective device position and to select a device position for use in the treatment from the set of candidate device positions based on a comparison of the determined sums, and (iii) an optimization unit configured to determine at least one optimized treatment parameter for the selected device position based on the constraint function.

The selection of device positions for the focal therapy treatment on the basis of a comparison of sums of negative derivatives of a constraint function is a heuristic approach which has proven to allow for an efficient and accurate automatic selection of device positions suitable for fulfilling the treatment goals.

In one embodiment of the invention, the selection unit is configured to determine a sum of negative derivatives for each non-selected candidate device position of the set of candidate device positions and to select a device position based on a comparison of all determined sums. This embodiment involves a common evaluation of all relevant candidate device positions, independent of the insertion points for reaching these device positions, and, thus, allows for a common selection of a device position and an insertion point (where the insertion point is implicitly selected and corresponds to the insertion point via which the selected device position can be reached). As an alternative, an insertion point may be selected at first and a related device position may then be selected by comparing sums of negative derivatives of the constraint function with respect to the treatment parameters associated with the device positions reachable via the selected insertion point. Compared with this alternative approach, the common evaluation of all relevant candidate device positions involves less computational complexity and is therefore more efficient. Moreover, it generally leads to more accurate results. In a further embodiment of the invention, the set of candidate device positions includes only one device position for each of a set of predetermined insertion points into the patient body. In this embodiment, there is effectively no difference between the selection of an insertion point and the selection of a device position. In this configuration, the common selection of device positions and insertion points is especially efficient.

A separate selection of an insertion point and a device position would result in unnecessary calculations.

In a related embodiment, the devices are inserted into the patient body via a template grid comprising a pattern of insertion holes. Via these insertion holes, the devices may be inserted into the patient body along a straight trajectory in a defined direction. When the insertion depth of the devices can be determined in advance (i.e. before carrying out the optimization of the treatment parameters) on the basis of the anatomical configuration of the relevant body region, as it is usually the case for brachytherapy catheters, for example, the insertion holes correspond to insertion points into the patient body which are associated with only one relevant candidate device position, respectively. Therefore, the common selection of device positions and insertion points allows for an efficient treatment planning particularly in case the devices are inserted into the patient body via a template grid.

However, the set of candidate device positions may likewise include several device positions for each of a set of predetermined insertion points. Also in such a configuration, the common selection of device positions and insertion points allows for an efficient selection of device positions.

In one embodiment of the invention, the system is configured to control the selection unit and the optimization unit to select several device positions and determine optimized treatment parameters associated with these device positions in an iterative procedure comprising a plurality of steps. In a related embodiment, the selection unit is configured to select a new device position in each step of the iterative procedure by evaluating the derivatives of the constraint function on the basis of previously determined optimized treatment parameters associated with previously selected device positions. In a further related embodiment, the optimization unit is configured to determine optimized treatment parameters for all selected device positions in each step of the iterative procedure, including treatment parameters for the device position selected in the respective step and in previous steps of the iterative procedure. These embodiments allow for an efficient determination of several device position and a generation of a related treatment plan in an integrated procedure.

In one embodiment, the system is configured to obtain a position of at least one device already inserted into the patient body and the constraint function generation unit is configured to generate the constraint function based on an estimated amount of the treatment quantity applied to the body region by the at least one already inserted device operated in the obtained position in accordance with associated treatment parameters. This embodiment allows for a real-time treatment planning on the basis of detected device positions. In particular, this embodiment allows for a re-optimization of a treatment plan when devices have been misplaced so that the detected device position deviates from the planned position.

It has been found that the system can advantageously be used in the planning of a thermal ablation treatment. Therefore, one embodiment of the invention includes that the focal therapy treatment includes a thermal ablation treatment, the one or more devices are thermal ablation probes, the treatment quantity corresponds to a temperature or a thermal dose, and the treatment parameters relating to a device position of a thermal ablation probe specify values of at least one operation parameter to be used for operating the thermal ablation probe in different time intervals during the thermal ablation treatment.

In a related embodiment of the invention, the constraint function generation unit is configured to generate a constraint function representing clinical requirements relating to temperature distributions in the body region in each of the time intervals, the constraint function comprising a weighted sum of further constraint functions, each further constraint function representing clinical requirements relating to the temperature distribution in the body region in one of the time intervals and comprising a weighted sum of individual constraint functions, each individual constraint function representing one clinical requirement relating to the temperature distribution in the respective time interval. Such a constraint function can be generated in a relatively simple manner and allows for an accurate and efficient planning of a thermal ablation treatment based on requirements relating to the temperature distributions in the time intervals of the treatment.

In a further embodiment of the invention relating to the planning of a thermal ablation treatment, the selection unit is configured to determine, for each of the at least some non-selected candidate device positions, a sum of negative derivatives of the constraint function with respect to the operation parameters associated with the respective device positions over all time intervals. In this manner the selection procedure carried out by the selection unit can efficiently be applied in the planning of a thermal ablation treatment.

In a further embodiment of the invention, the focal therapy treatment includes a brachytherapy treatment, the one or more devices are brachytherapy catheters, each catheter being configured to hold one or more radiation sources at discrete dwell positions, the treatment quantity corresponds to a radiation dose, and the treatment parameters relating to a device position of a brachytherapy catheter specify time durations for holding a radiation source at each of the dwell positions during the treatment.

In a further aspect, the invention suggests a method for assisting in planning a focal therapy treatment of a structure within a patient body by applying a treatment quantity to a body region including the structure using one or more devices, the devices being operated within the patient body in one or more device positions and in accordance with treatment parameters associated with the device positions, each device position being reached via an associated insertion point into the patient body. The method comprises: (i) generating a constraint function representing clinical requirements relating to the treatment quantity, the constraint function depending upon at least one associated treatment parameter of each candidate device position of a set of candidate device positions associated with different insertion points, (ii) determining, for each of at least some non-selected candidate device positions of the set, a sum of negative derivatives of the constraint function with respect to the treatment parameter associated with the respective device position and to select a device position for use in the treatment from the set of candidate device positions based on a comparison of the determined sums, and (iii) determining at least one optimized treatment parameter for the selected device position based on the constraint function.

In a further aspect, the invention suggests a computer program comprising executable code for executing the method, when executed by a processor of a computer device.

It shall be understood that the system of claim 1, the method of claim 14 and the computer program of claim 15 have similar and/or identical preferred embodiments, in particular as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

The present invention can be applied in the treatment planning of focal therapy treatments of tumors, particularly including thermal ablation therapy and brachytherapy. In the following, embodiments of the invention will be described with respect to these specific types of treatments by way of example.

(Brachytherapy Treatment Planning)

Figure 1:
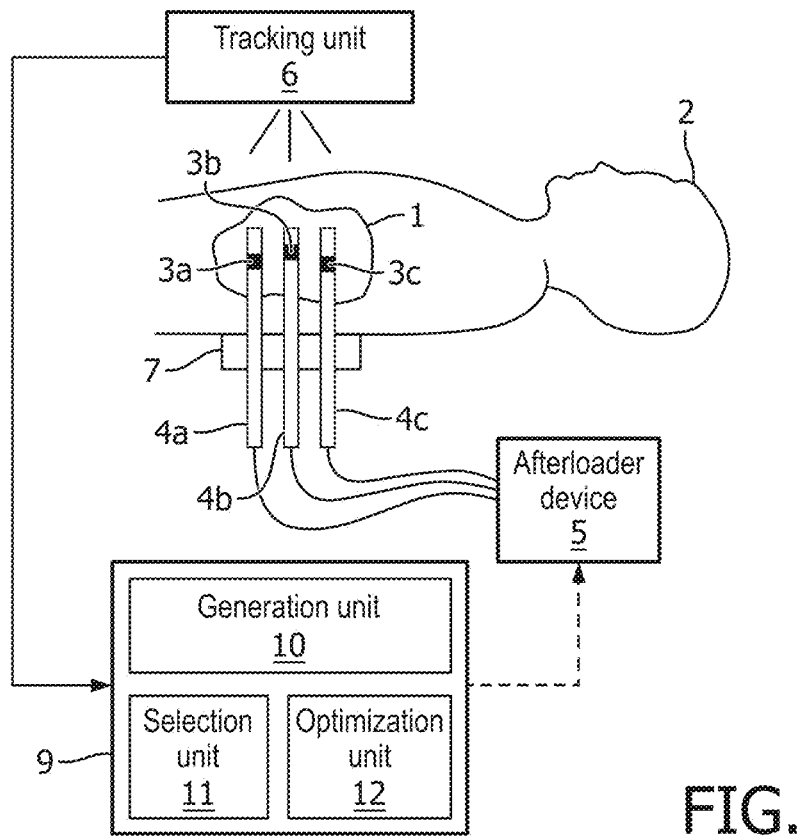
FIG. 1 schematically and exemplarily shows components of brachytherapy system.

FIG. 1 schematically and exemplarily shows components of a system for delivering brachytherapy treatments to patients in order to treat target structures 1, such as tumors, in the patient body 2. During a brachytherapy treatment, the target structure 1 is irradiated by means of radiation sources 3a,b,c, which are temporarily placed in the body region including the target structure 1 (in FIG. 1, three radiation sources 3a,b,c are shown by way of example). The radiation sources 3a,b,c may particularly include radioactive particles emitting ionizing radioactive radiation for treating the target structure 1.

The radiation sources 3a,b,c are delivered to the body region and held at specific positions by means of catheters 4a,b,c. These positions are also referred to as dwell positions and the time intervals during which the radiation sources 3a,b,c are held at the dwell positions are also referred to as dwell times. Each catheter 4a,b,c provides a number of possible discrete dwell positions and holds one or more radiation sources 3a,b,c at these positions during the treatment. For instance, each catheter 4a,b,c may provide between 5 and 15 possible dwell positions.

The catheters 4a,b,c may be coupled to an afterloader device 5, which automatically delivers the radiation sources 3a,b,c into the catheters 4a,b,c. Further, in order to localize the one or more catheters 4a,b,c in the patient body 2, a suitable tracking unit 6 may be provided. The tracking unit 6 may be configured for an image-based tracking of the catheters 4a,b,c or in accordance with another suitable tracking modality.

Figure 2A:
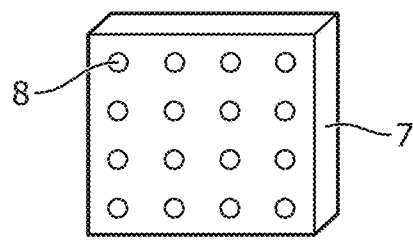
FIG. 2A schematically and exemplarily shows a template grid for assisting in inserting brachytherapy catheters, FIG. 2B schematically and exemplarily shows brachytherapy catheters inserted via the template grid in different catheter positions, FIG. 3 schematically and exemplarily illustrates steps for determining a treatment plan for a brachytherapy treatment, FIG. 4 schematically and exemplarily shows components of a thermal ablation therapy system, FIG. 5 schematically and exemplarily shows thermal ablation probes held inserted via one insertion point into the patient body and held in different ablation positions, and FIG. 6 schematically and exemplarily illustrates steps for determining a treatment plan for a thermal ablation treatment.
Figure 2B:
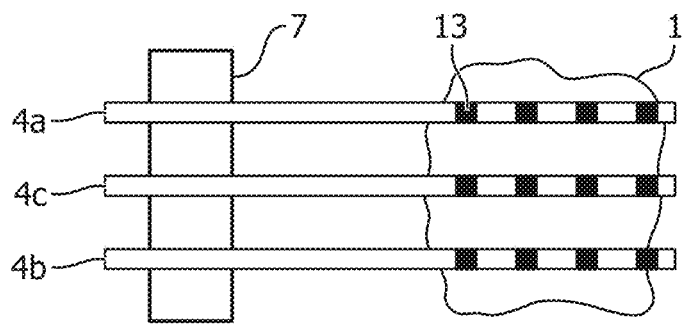

The catheters 4a,b,c are inserted into the patient body 2 through a two-dimensional grid 7, which is also referred to as template grid herein, and which is schematically and exemplarily shown in FIG. 2A. The template grid 7 comprises rows and columns of holes defining the insertion points through which the catheters 4a,b,c can be inserted into the patient body 2, where one hole is provided with the reference numeral 8 in FIG. 3. In specific implementations, the template grid 7 may include between 4×4 and 10×10 holes, for example. Through these holes 8, the catheters 4a,b,c are inserted into the patient body 2 along straight trajectories, which are essentially perpendicular to the rows and columns of the template grid 7. As schematically and exemplarily shown in FIG. 2B, the trajectories are usually selected such that they intersect the target structure 1. Along such trajectories the catheters 4a,b,c may be inserted in such a way that one or more dwell positions are located within the target structure 1, where one dwell positions is provided with the reference numeral 13 in FIG. 2A.

The number of catheters 4a,b,c to be used in the treatment of a particular patient and the catheter configuration to be used for each catheter 4a,b,c are specified in a treatment plan. Moreover, the treatment plan specifies for each of these catheters 4a,b,c, the dwell positions to be populated by the radiation sources and the associated dwell times. In general, the catheter configuration for a catheter 4a,b,c defines the insertion point through which the catheter 4a,b,c is inserted into the patient body 2 and the positions to be reached when inserting the catheter into the patient body 2 via the insertion point. In case of a free-hand positioning of the catheters 4a,b,c, each insertion point is typically associated with several catheter positions, which may differ in the insertion angle of the catheter 4a,b,c. However, in the present system, each catheter 4a,b,c is inserted through one hole 8 of the template grid 7 and each hole 8 is associated with one catheter trajectory. For each hole 8, also a suitable insertion depth of a catheter 4a,b,c inserted through the hole 8 may be determined in advance. Therefore, each insertion point is associated with one catheter position for use in the treatment.

For generating the treatment plan, the brachytherapy system comprises a planning unit 9. The planning unit 9 is preferably configured as a computer device, such as a personal computer (PC), executing a software for generating the treatment plans for brachytherapy treatment in a way described in the following. For this purpose, the computer device particularly comprises a processing unit for running the software and interfaces for receiving data required for carrying out the planning procedure. Moreover, the computer device comprises suitable input and output means for interacting with a user so that the user can initiate and control the planning procedure and review the results of this procedure.

In the planning unit 9, the treatment plan may be generated prior to the treatment based on a planning image of the region of the patient body 2 showing the body region including the target structure 1 of the treatment. Using the planning image, the anatomical configuration of the relevant body region is determined. In particular, the location of the target structure 1 and of sensitive anatomical structures in the vicinity thereof—which are also referred to as organs at risk (OARs)—are determined in a manner known to the person skilled in the art. Moreover, the treatment plan is generated on the basis of a clinical prescription for the patient, which may particularly specify treatment goals with respect to the target structure 1 and the surrounding tissue. In general, the treatment goals include the delivery of a sufficiently high radiation dose to the target structure 1 and the delivery of only a small radiation dose to OARs.

In the planning procedure carried out by the planning unit 9, the catheter positions to be used in the treatment as well as the dwell positions to be populated in the catheters 4a,b,c and the associated dwell times are determined in such a way that the treatment goals are fulfilled. For this purpose, the planning unit 9 performs an optimization procedure on the basis of a model describing the radiation dose applied to the target structure 1 and the OARs as a function of the possible dwell positions (for all possible catheter positions) and the associated dwell times.

The model may be established based on the known radiation intensities of the radiation sources 3a,b,c, the anatomical configuration of the treatment region including the target structure 1 and the relevant OARs and based on the absorption characteristics of the different types of tissue included in the treatment region with respect to the applied radiation. Using such a model, a radiation dose distribution $d_R$ in the body region including the target structure 1 and the surrounding OARs can be defined as a function of the dwell times associated with the possible catheter configurations. The radiation dose distribution quantifies the spatial distribution of the radiation absorbed in the relevant body.

In one implementation, the radiation dose $d_{R_j}$ absorbed by the volume element j of the relevant body region may be linearly approximated on the basis of the applied model. When the dwell times are denoted as $\tilde{t}_k$ and indexed using an index k identifying the dwell positions of the used catheters, the radiation dose $d_j$ may thus be calculated in accordance with $$d_j = \sum_k P_{jk} \cdot \tilde{t}_k$$

where $P_{jk}$ denotes the jk-component of a matrix P, which is also referred to as influence matrix and which is calculated in accordance with the selected model. Each component $P_{jk}$ of the influence matrix quantifies the amount of dose absorbed by the volume element j per unit time due to emission from the radiation source 3a,b,c at dwell position k.

The optimization problem that is solved in order to generate the treatment plan is established on the basis of the prescribed treatment goals, which specify requirements for the radiation dose distribution in the body region including the target structure 1 and the OARs. For instance, the treatment goals may require the delivery of a certain minimum radiation dose to the target structure 1 during the treatment and the delivery of a maximum radiation dose to OARs. Further exemplary treatment goals may require the delivery of a uniform dose to a certain region of the target structure 1.

Based on the treatment goals prescribed for the particular treatment to be planned, a constraint function is generated, which depends upon the dwelling times for all possible dwelling positions, and the dwelling positions and dwelling times to be used during the treatment are determined such that they approximately minimize the constraint function.

The constraint function is generated in a constraint function generation unit 406 of the planning unit 405. Similar to the constraint function used in the brachytherapy planning described above, the constraint function used in the thermal ablation therapy planning may comprise a collection of individual constraint functions $F^B_k$, where each individual constraint function $F^B_k$ may represent one requirement with respect to the radiation dose distribution as specified in the treatment goals. In one embodiment, the general constraint function $F^B$ may particularly correspond to a weighted sum of the individual constraint functions $F^B_k$, i.e.

$$F^B = \sum_k w^B_k \cdot F^B_k$$

where parameter $w^B_k$ denotes the weight of the individual constraint function $F^B_k$. Due to the weighting, requirements having a higher weight are satisfied more likely than requirements having a lower weight, particularly in case such requirements are in conflict with each other. Hence, the weights are preferably selected in accordance with the importance of the requirements with respect to the success of the treatment. Each individual constraint function $F^B_k$ usually depends on the radiation dose for certain volume elements and related dose goals. Preferably, the individual constraint functions $F^B_k$ are configured as two-sided or one-sided closed proper convex quadratic functions.

The constraint function generated in the constraint function generation 10 depends upon the radiation dose distribution as generated using all dwelling positions that can be realized using the catheter positions included in the set of candidate catheter positions. Thus, the constraint function is given as $F^B = F^B(t_1, \ldots, t_N)$, when the set includes N catheter configurations and when $t_i$ is a vector including the dwelling times of all dwelling positions that can be realized when using a catheter in the i-th candidate catheter position. Assuming that each catheter provides ND possible dwell positions, the vector $t_i$ is given by $t_i = (t_i^1, \ldots, t_i^{N_D})$, where $t_i^n$ to denotes the dwelling time for the n-th dwell position of the catheter used in accordance with the i-th catheter configuration of the predetermined set of catheter configurations.

Figure 3:
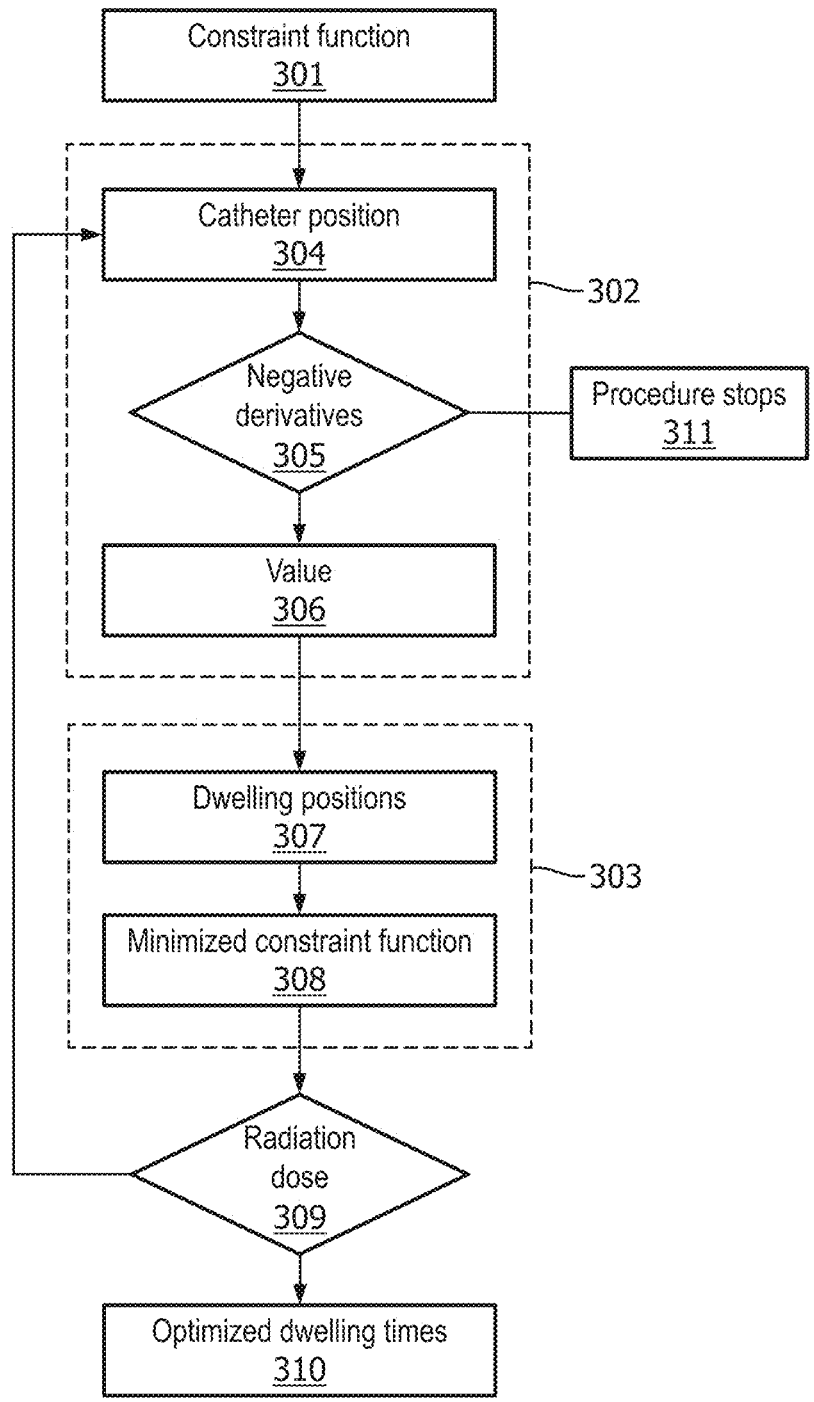

On the basis of this constraint function, the planning unit 9 determines the treatment plan by applying an iterative procedure, which will be explained in the following. Steps of this procedure are also illustrated in FIG. 3. When the constraint function has been generated in step 301, the procedure is initialized and no catheter position may be selected yet for use in the treatment. In an alternative implementation, one or more catheter configurations may already be selected. This selection may have been made manually by the user of the planning unit 9 on the basis of his experience, e.g. from prior treatments delivered to body regions of other patients having a similar anatomical configuration as the relevant body region of the current patient.

Upon the initialization, the first step of the iteration procedure is carried out. In this iteration step, a first catheter position is selected from the set of candidate catheter positions. In each subsequent iteration steps, one additional catheter position is selected from the set. Moreover, dwelling times to be used during the treatment are determined for the selected catheter positions in each step of the iteration. This determination also involves a selection of the dwelling positions of the catheters 4a,b,c, which are to be populated during the treatment since dwelling times greater than zero are only determined for these dwelling positions. Put in another way, a dwelling time of zero indicates that the associated dwelling position is not populated with a radiation source 3a,b,c.

As shown in FIG. 3, each iteration step comprises a selection stage 302, which is performed by a selection unit 11 of the planning unit 9, and in an optimization stage 303 performed by an optimization unit 12 of the planning unit 9.

In the selection stage, the selection unit 11 selects a new catheter position for use during the treatment on the basis of a heuristic approach, which has proven to deliver accurate results in many cases. In accordance with this approach, the selection unit 11 determines for each non-selected candidate catheter position a sum of negative derivatives of the constraint function with respect to the dwelling times associated with the respective catheter position in step 304. Thus, the selection unit 11 calculates for each non-selected catheter position c the sum $g_c$, which is given by $$g_c = \sum_{j=1}^{N_c} \begin{cases} \frac{\partial F^B}{\partial t_c^j}, & \text{if } \frac{\partial F^B}{\partial t_c^j} < 0 \\ 0, & \text{otherwise} \end{cases}$$

where $t_c^j$ is the dwelling time for the j-th dwell position of the catheter used in the c-th candidate catheter position and $N_c$ denotes the number of candidate dwelling positions associated with the c-th candidate catheter position. In one implementation the candidate dwelling positions correspond to those dwelling positions of a catheter 4a,b,c used in the c-th candidate catheter position, which are located in the target structure 1 or at least in a certain maximum distance from the target structure 1.

The derivatives of the constraint function are calculated in a discretized form as known to the person skilled in the art. In order to evaluate the derivatives of the constraint function with respect to the dwelling times, all dwelling times associated with the non-selected catheter positions are set to a predefined value. This value may particularly be zero in order to facilitate the evaluation. Moreover, the dwelling times associated with catheter positions which have already been selected before are set to their previously determined optimized values.

In the next step 305, the selection unit 11 checks whether at least one of the sums $g_c$ of negative derivatives of the constraint function determined in the aforementioned way is smaller than zero. This will be the case if at least one of the evaluated derivatives of the constraint function is negative. If this is not the case, the procedure stops in step 311. If the preceding iteration step has not lead to an acceptable treatment plan, the optimization may be newly initiated on the basis of a modified optimization problem. The modification may include a change of the weights of the individual constraint functions, for example.

If the check in step 305 is affirmative, the selection unit 11 compares all calculated sums $g_c$ and determines the sum $g_c$ having the smallest (i.e the most negative) value in step 306. As a result of the comparison, the selection unit 11 selects the candidate catheter position for which the smallest sum $g_c$ has been calculated as a new catheter position to be used during the treatment. This catheter position is then indicated to the optimization unit 12. In such a manner, it is generally possible to select a catheter position suitable for achieving the prescribed treatment goals.

The aforementioned heuristic approach for selecting catheter positions is based on the observation that the optimal dwelling times minimize the constraint function so that the catheter positions for which the most negative accumulated derivatives are determined will likely be the most appropriate catheter positions for the treatment.

In alternative implementations of this approach, the selection unit 11 may not only select one new catheter position but a predetermined number of several catheter positions associated with the smallest sums $g_c$. This implementation reduces the number of iteration steps required for selecting a larger number of catheter positions. However, it may lead to less accurate results.

In step 307, the optimization unit 12 receives the newly selected catheter position(s) in order to determine optimized dwelling times (and, implicitly, also the dwelling positions to be used during the treatment) particularly for this catheter position. However, the optimization unit 12 does preferably not determine optimized dwelling times for the newly selected catheter position(s) alone. Rather, the optimization unit 12 may determine optimized dwelling times for all previously selecting catheter positions—including the catheter position selected in the current step of the iteration procedure and the catheter positions selected before—in each step of the iteration procedure. Hereby, account can be taken of the fact that the dwelling times necessary for achieving a certain radiation dose distribution mutually influence each other.

In order to determine the optimized dwelling times for the selected catheter positions, the optimization unit 12 processes a version of the constraint function in which the dwelling times of the selected catheter positions are variable (as they correspond to the parameters to be optimized) and in which the dwelling times associated with the non-selected catheter positions are set to zero.

This version of the constraint function is approximately minimized in the optimization unit 12 in step 308. Thus, the optimization unit 12 determines the dwelling positions associated with the selected catheter positions, which approximately minimize the relevant version of the constraint function. For this purpose, the optimization unit 12 may apply any suitable numerical procedure known to the person skilled in the art.

Upon having determined the optimized dwelling times, the optimization unit 12 may estimate the radiation dose distribution that is achieved when using these dwelling times during the treatment. Then, it may be checked in step 309 whether the radiation dose distribution fulfills the prescribed treatment goals such that the optimization result can be accepted. This may be done by the optimization unit 12 in an automatic procedure. As an alternative, the estimated radiation dose distribution and related parameters, such as, for example, dose-volume histograms of the target structure and/or the OARs, may be presented to the user of the planning unit 9 and the user may accept or reject the optimization result. The result may be rejected, if the treatment goals are not sufficiently fulfilled and/or if it is likely that the result can be improved in a further iteration step.

If the result of the optimization stage is not accepted, the planning unit 9 may perform a further step of the iterative procedure to select a further catheter position and determine optimized dwelling positions for this catheter position and the previously selected catheter position as described above.

If the result of the optimization stage is accepted in one iteration step, the planning unit 9 generates the treatment plan on the basis of the selected catheter positions and the associated optimized dwelling times in step 310. Thereupon, the treatment may be delivered on the basis of the generated treatment plan.

In the aforementioned way, it is possible to generate a treatment plan for a brachytherapy treatment "offline" prior to the treatment. In addition, the described procedure can be applied with slight modifications to re-optimize catheter positions and dwelling times in case the position of an already inserted catheter 4a,b,c deviates from the planned position. This may e.g. be the case if the catheter has been inserted into the patient body 2 too far, i.e. with an insertion depth greater than the planned insertion depth.

In a related embodiment, the successively inserted catheters 4a,b,c are tracked using the tracking unit 6 and, for each inserted catheter 4a,b,c, it is checked whether its position corresponds to the planned position. If it is determined that the position of a catheter 4a,b,c deviates from the planned position by more than a predetermined amount, a re-planning procedure may be carried out in the planning unit 9 in order to re-optimize the positions of the following catheters and the associated dwelling times. The re-optimization procedure is preferably carried out in real time.

In this procedure, the constraint function generation unit 10 generates a version of the constraint function based on the positions of the already inserted catheters 4a,b,c. On the basis of this version of the constraint function, an optimization procedure is carried out in a similar way as explained above. The procedure is initiated starting with the determined locations of the inserted catheters 4a,b,c as already selected catheter positions. In the procedure, the selection unit 11 then selects one or more further catheter positions from a set of candidate catheter positions as explained above. Moreover, the optimization unit 10 determines optimized dwelling times for the newly selected catheter positions and the positions of the already inserted catheters as described above. The set of candidate catheter positions used in this procedure preferably no longer include the candidate catheter positions corresponding to the planned positions of the already inserted catheters.

(Thermal Ablation Therapy Planning)

Figure 4:
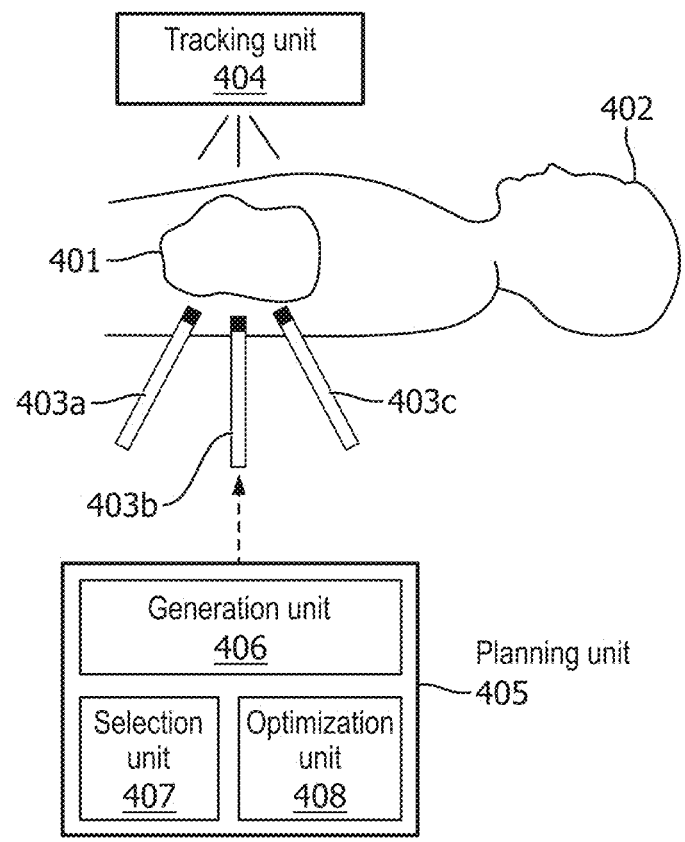

FIG. 4 schematically and exemplarily shows a thermal ablation system for delivering a thermal ablation treatment to a target structure 401 within a patient body 402, where the target structure 401 may again be a tumor. In thermal ablation, extreme temperatures are applied to the target structure 401 by means of one or more thermal ablation probes 403a,b,c (by way of example, three probes are shown in FIG. 4).

The probes 403a,b,c may be configured for hyperthermic ablation, i.e. they may be configured to apply energy to the target structure 401 in order to heat the tissue to kill cells, particularly cancer cells. For instance, the energy may be provided by means of a radiofrequency (RF) electric current—this approach is also referred to as RF ablation—or by means of microwave radiation or ultrasound waves emitted by the thermal ablation probes 403a,b,c. In RF ablation, the probes 403a,b,c apply an electrical current directly to the target structure 401 by means of electrodes of the probes 403a,b,c contacting the target structure 401 within the patient body 402. The current flows through the target structure 401 to a second electrode, which may also directly contact the target structure 401 or which may be affixed to the skin surface of the patient body 402. For microwave ablation, the probes 403a,b,c comprise antennas for emitting microwave radiation which may be generated by a microwave generator outside the patient body 402 and guided to the antennas through cables connecting the probes 3a,b,c and the microwave generator. For ultrasound ablation, the probes 3a,b,c may comprise miniaturized ultrasound transducers which can be brought into contact with or in sufficiently close distance to the target structure 401 to apply ultrasound waves to the target structure 401.

In further embodiments, the probes 403a,b,c may be configured for hypothermic tumor ablation, i.e. they may cool the target tissue. In this embodiment, the probes 403a,b,c may be configured as cryoprobes for delivering a cooling fluid to the target structure 401. These probes may be configured in any way known to the person skilled in the art. For instance, a gaseous refrigerant, such as argon, may be delivered to the tip of the probes 403a,b,c, where it may expand so that it cools down due to the Joule-Thomson effect and creates a heat sink cooling the adjacent tissue.

In the different embodiments, the thermal ablation probes 403a,b,c may be configured as needle-like devices which may be inserted into the patient body 402 by an interventionist within the scope of a minimally invasive intervention. In this procedure, tissue ablation is carried out on one or more thermal ablation probes 403a,b,c in specific ablation positions. In case several ablation positions are used, one ablation probe 403a,b,c may be operated in each ablation position and the probes 403a,b,c may be operated simultaneously or consecutively. As an alternative, only one ablation probe 403a,b,c may consecutively be steered to and operated in the ablation positions. In order to steer the one or more probes 403a,b,c to the ablation positions, they are inserted to the patient body 402 at specific insertion points associated with the ablation positions. The insertion points are selected such that the probes 403a,b,c can be steered to the ablation positions with minimal harm of healthy tissue.

In order to localize the one or more ablation probes 403a,b,c in the patient body 402, a suitable tracking unit 404 may be provided. The tracking unit 404 may be configured for an image-based tracking of the ablation probes 403a,b,c or may be configured in accordance with another (i.e. non-image-based) tracking modality, such as, for example, electromagnetic tracking.

The ablation positions as well as the associated insertion positions to be used in a treatment of a particular target structure 401 or patient are specified in a treatment plan. The treatment plan further specifies operation parameters for operating the ablation probes 403a,b,c during the treatment. For each ablation position, these parameters may be included in a so-called profile. In order to generate the profiles, the time duration of the treatment may be divided into small time intervals and, for each time interval, the profile associated with a certain ablation position may specify a value for an operation parameter of the ablation probe 403a,b,c operated in the respective position.

In RF ablation, the operation parameter may particularly specify the current applied to the tissue. For microwave and ultrasound ablation, the corresponding operation parameter may particularly specify the power of the electromagnetic radiation or ultrasound waves emitted by the respective ablation probe 403a,b,c. In cryoablation, the operation parameter may correspond to a certain temperature of the used cryoprobes 403a,b,c during its operation as a heat sink. In some embodiments, the ablation probes 403a,b,c may be controllable to set the current or power to a variable multiple of a standard current, power or temperature. In these embodiments, the operation parameters included in the profiles may be factors specifying this multiple.

For generating the treatment plan, the thermal ablation therapy system comprises a planning unit 405. Similar to the planning unit 9 of the brachytherapy system, the planning unit 405 of the thermal ablation therapy system may be configured as a computer device, such as a personal computer (PC), executing a software for generating the treatment plans for brachytherapy treatment in a way described in the following. For this purpose, the computer device particularly comprises a processing unit for running the software and interfaces for receiving data required for carrying out the planning procedure. Moreover, the computer device comprises suitable input and output means for interacting with a user so that the user can initiate and control the planning procedure and review the results of this procedure.

In the planning unit 405, the treatment plan may be generated prior to the thermal ablation treatment based on a planning image of the region of the patient body 402 showing the body region including the target structure 401 of the treatment. Using the planning image, the anatomical configuration of the relevant body region is determined. In particular, the location of the target structure 402 and of sensitive tissue in the vicinity thereof are determined in a manner known to the person skilled in the art. Moreover, the treatment plan is generated on the basis of a clinical prescription for the patient, which may particularly specify treatment goals with respect to the target structure 401 and the surrounding tissue.

In the planning procedure carried out by the planning unit 405, the insertion points and associated ablation positions to be used in the treatment are determined such that the treatment goals are fulfilled. Moreover, a profile including the operation parameters for operating the ablation probes 403a,b,c is determined for each ablation position specified in the treatment plan.

Figure 5:
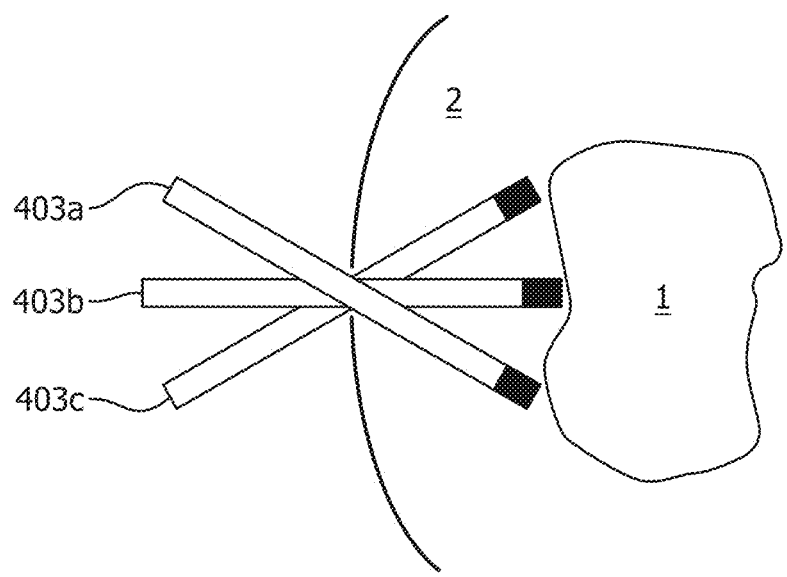

For carrying out the planning procedure a set of candidate insertion points and associated candidate ablation positions is preferably determined in a suitable manner. In one embodiment, the ablation probes 403a,b,c may be inserted into a patient body using a template grid as described above in connection with the brachytherapy treatment planning. In this case, each insertion point is defined by a hole of the template grid and is associated with one ablation position or several ablation positions which differ with respect to insertion depth of the ablation probe 403a,b,c. However, in further embodiments, the ablation probes 403a,b,c may be positioned using a free-hand positioning procedure. In these embodiments, there may be plural candidate ablation positions for each candidate insertion point which differ with respect to the insertion angle of the probes. This is schematically and exemplarily illustrated in FIG. 5 showing ablation probes 403a,b,c in different ablation positions that can be reached via the same insertion point. Moreover, several candidate ablation positions may be provided for at least some insertion angles, which differ with respect to the insertion depth.

In the brachytherapy treatment planning described above, a fixed insertion depth could be specified for each insertion point because the brachytherapy catheters usually provide several dwelling positions allowing to hold radiation sources 3a,b,c in different distances from the insertion point. However, the ablation probes 403a,b,c usually have only one active section, which is usually located at the tip of the ablation probes 403a,b,c so that different distances of the active section to the insertion point are realized on the basis of different insertion depths.

For determining the insertion points, the ablation positions and the associated profiles, the planning unit 405 performs an optimization procedure on the basis of a model describing the temperature distribution in the body region including the target structure 401 or the thermal dose applied to the target structure 1 and the surrounding tissue as a function of the possible ablation positions and the associated profiles.

In one embodiment, the model may be created based on Pennes' bioheat model described in H. H. Pennes, "Analysis of Tissue and Arterial Blood Temperatures in the Resting Human Forearm", Journal of Applied Physiology, vol. 1, no. 2, pages 93-122, 1948. In accordance with this model, the temperature distributions in living tissues is estimated on the basis of a partial differential equation which is also known as bioheat transfer equation (BHTE). The planning procedure carried out by the planning unit 405 may be based on a discretized version of this equation which may be written as $$[\rho c_p M + dt(k_{ti} S + \omega_{bl} M)](T^n - T_{core}) = dt M Q^n + \rho c_p M(T^{n-1} - T_{core}),$$ (1)

where $k_{ti}$ is the thermal conductivity of the respective tissue, $T^n$ is the spatial temperature distribution within the patient body in the n-th time step of the discretization, $Q^n$ is the heat distribution in the n-th time interval, $\omega_{bl}$ is the blood perfusion parameter and $T_{core}$ is the body temperature of, for instance, 37° C. $\rho$ denotes the tissue density, and $c_p$ denotes the tissue heat capacity. The physiological parameters $k_{ti}$, $\omega_{bl}$, $T_{core}$, $\rho$, $c_p$ usually vary between different anatomical structures of the patient body, particularly between different tissue types, and thus, are individually determined for these structures. When $N_p$ ablation probes 403a,b,c are used, the total heat distribution in the n-th time interval of the treatment may be approximated by $$Q^n = \sum_{i=1}^{N_p} p_i^n Q_i$$

Here, $Q_i$ denotes the heat distribution generated by an ablation probe 403a,b,c in the i-th ablation position, when the probe 403a,b,c is operated at the standard operation condition (e.g. at the aforementioned standard power, current or temperature), and $p_i^n$ are scaling factors corresponding to the multiple of the value of the operation parameter used in the standard operation condition associated with the i-th ablation position and the n-th time step. The heat distribution generated by the ablation probes 3a,b,c in the patient body 2 and thus, the temperature distribution P for each time step n obviously depends on the ablation position.

Using the aforementioned expression for the heat distribution $Q^n$, the discretized BHTE may be iteratively solved for a given initial temperature $T^0$—which may correspond to the core temperature $T_{core}$—in order to obtain the temperature distributions P for all time steps as a function of the profiles associated with a given set ablation positions. In the following, it is assumed that the time steps of the discretization of the BHTE correspond to the time intervals of the thermal ablation treatment. Thus, the profiles include one profile value for each time step. However, it will be understood that in other implementations, the time steps of the discretization may not correspond to the time intervals of the treatment. In particular, these time intervals may comprise several time steps. In this case, the profile values are valid for several time steps of the discretization.

In case the treatment parameters specify requirements for the thermal dose applied to the target structure 401 and the surrounding tissue rather than requirements for the temperature distributions in the individual time intervals, a thermal dose $d_T(T_1, \ldots, T_N)$ applied to the target structure 1 and the surrounding tissue during the treatment is computed on the basis of the temperature distributions, where N denotes the number of time intervals of the treatment. The thermal dose represents the thermal damage in the tissue taking into consideration the exposure of the tissue to a certain course of temperature over time and may be estimated on the basis of a suitable model for the effects applied heat has to the tissue. Such models are known to the person skilled in the art. Related examples include models based on the Arrhenius damage integral.

The optimization problem that is solved in order to generate the treatment plan is established on the basis of the prescribed treatment goals. In different embodiments, these treatment goals may specify requirements for the temperature of the target structure and the surrounding tissue in the individual time intervals of the treatment, or they may specify requirements with respect to the thermal dose applied to the target structure and the surrounding tissue during the treatment. For instance, the treatment goals specify a certain minimum temperature change of the target structure and a certain maximum temperature change of the surrounding tissue to be achieved for each time interval of the treatment. Alternatively, the treatment goals may specify a certain minimum thermal dose to be delivered to the target structure during the entire treatment and a certain maximum thermal dose to be delivered to the surrounding tissue during the entire treatment.

Based on the treatment goals prescribed for the particular treatment to be planned, a constraint function is generated, which depends upon the profiles for all possible ablation positions, and the ablation positions and profiles to be used during the treatment are determined such that they approximately minimize the constraint function.

The constraint function is generated in a constraint function generation unit 10 of the planning unit 9. The constraint function may comprise a collection of individual constraint functions $F^B_k$, where each individual constraint function $F^B_k$ may represent one requirement with respect to the thermal dose distribution or a temperature distribution in a certain time step as specified in the treatment goals.

In case the treatment goals specify requirements for the thermal dose, the constraint function $F^T$ may correspond to a weighted sum of the individual constraint functions $F^T_k$, i.e.

$$F^T = \sum_k w^T_k \cdot F^T_k$$

where parameter $w^T_k$ denotes the weight of the individual constraint function $F^T_k$. As explained above in connection with the brachytherapy planning, requirements having a higher weight are satisfied more likely than requirements having a lower weight, particularly in case such requirements are in conflict with each other. Each individual constraint function $F^T_k$ usually depends on the thermal dose for certain volume elements and related dose goals, where the thermal dose distribution is a function of the temperature distributions in the individual time steps of the treatment which may be estimated as explained above. In this respect, individual constraint functions may be generated similar to the individual constraint functions used in the brachytherapy planning.

In case the treatment goals specify requirements for the temperature distributions in the individual time interval of the treatment, a constraint function of the aforementioned form, can be generated for each time interval (where this constraint function depends on the temperature distribution in the respective time step rather than a thermal dose distribution). In order to carry out the planning procedure, one overall constraint function is preferably generated for all time intervals. It has been found that good results can be achieved by generating the overall constraint function as a weighted sum of the constraint functions for the individual time steps. Thus, the overall constraint function may be generated as $$F^T = \sum_{n=1}^{N} \lambda_n \sum_k w^T_{k,n} \cdot F^T_{k,n}$$

where $F^T_{k,n}$ denotes the individual constraint function relating to the k-th constraint for the n-th time interval, $w^T_{k,n}$ denotes an associated weight and $\lambda_n$ denotes the weight assigned to all constraint functions for the n-th time interval and N is the number of time intervals of the treatment. As said, the individual constraint functions $F^T_{k,n}$ for the n-th time interval may have a similar structure as the individual constraint functions generated for radiation or thermal-dose based treatment objectives but depend on the temperature distribution in the n-th rather than on a dose distribution.

Further, a regularization term may optionally be added to the constraint function, e.g. in order to enforce certain desired course of the profiles in time. For instance, a Tikhonov regularization may be used in order to avoid too extreme temperatures occurring over longer time periods, or a regularization term may be added to avoid greater temperature oscillations between adjacent time steps.

The constraint function generated in the constraint function generation unit 406 depends upon the temperature distributions in all time intervals of the treatment and which are functions of the profiles associated with the ablation positions. Thus, the constraint function is given as $F^T = F^T(p_1, \ldots, p_M)$, when M candidate ablation positions (associated with different insertion points) are provided and when $p_i$ is a vector including the profile associated with the i-th ablation position. When the value of the profile associated with the i-th ablation position for the n-th time step is denoted as $p^n_i$, the profile vector $p_i$ is given by $p_i = (p_i^1, \ldots, p_i^N)$.

On the basis of this constraint function, the planning unit 405 determines the treatment plan by applying an iterative procedure, which will be explained in the following. Steps of this procedure are also illustrated in FIG. 6.

When the constraint function has been generated in step 601, the procedure is initialized and no ablation position may be selected yet for use in the treatment. In an alternative implementation, one or more ablation positions may already be selected. This selection may have been made manually by the user of the planning unit 405 on the basis of his experience, as also described in connection with the brachytherapy treatment planning.

Upon the initialization, the first step of the iteration procedure is carried out. In this iteration step, a first ablation position is selected from the set of ablation positions. In each subsequent iteration steps, one additional ablation position is selected from the set. Moreover, the profiles to be used during the treatment are determined for the selected ablation positions in each step of the iteration.

Figure 6:
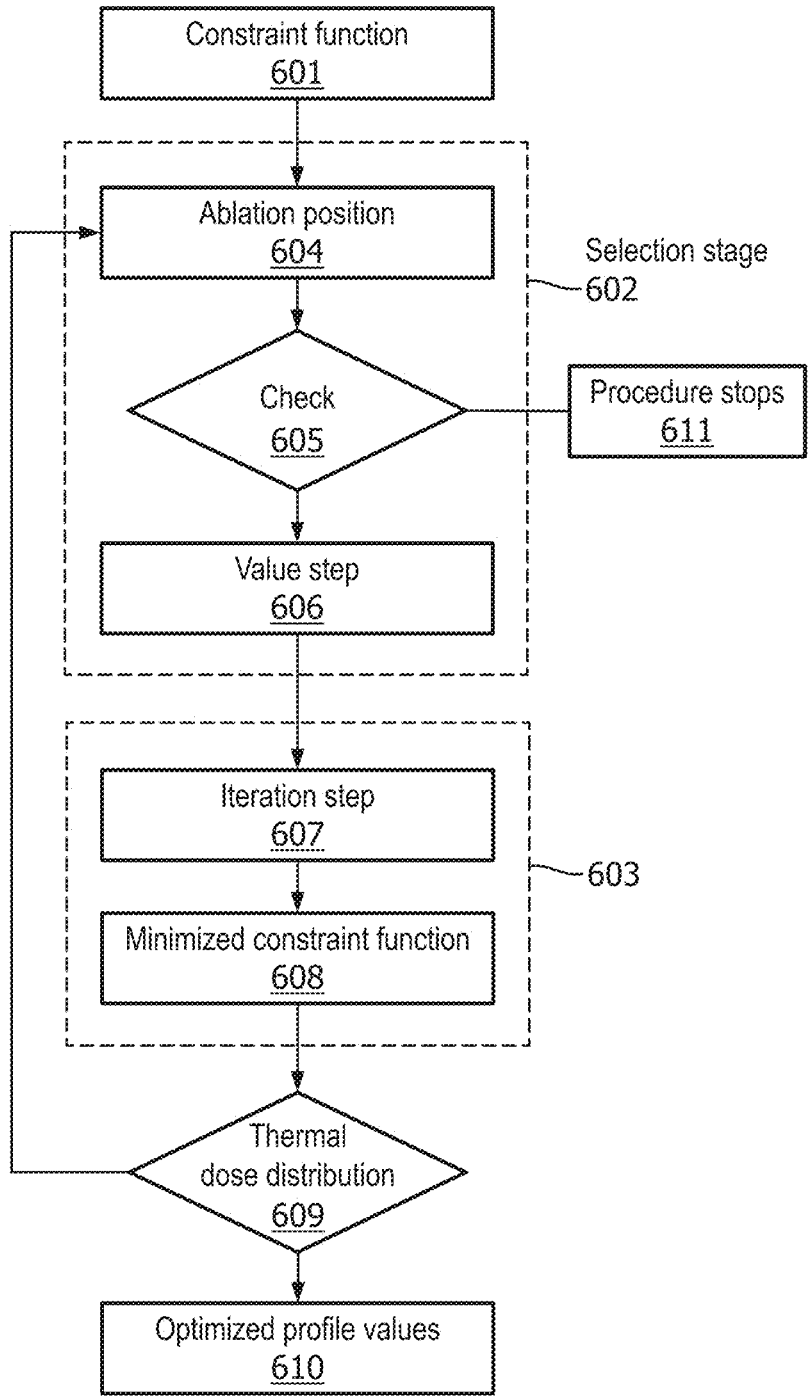

As shown in FIG. 6, each iteration step comprises a selection stage 602, which is performed by a selection unit 407 of the planning unit 405, and in an optimization stage 603 performed by an optimization unit 408 of the planning unit 405.

In the selection stage, the selection unit 407 selects a new ablation position for use during the treatment on the basis of a heuristic approach, which has proven to deliver accurate results in many cases and which is based on similar principles as the selection of catheter positions in the brachytherapy treatment planning described above.

In one embodiment, the selection unit 407 determines for each non-selected ablation position a sum of negative derivatives of the constraint function with respect to the profile values associated with the respective ablation position in step 604. Thus, the selection unit 407 calculates for each non-selected candidate ablation position c the sum $q_c$, which is given by $$q_c = \sum_{j=1}^{N} \begin{cases} \frac{\partial F^T}{\partial p_c^j}, & \text{if } \frac{\partial F^T}{\partial p_c^j} < 0 \\ 0, & \text{otherwise} \end{cases}$$

where $p_c^j$ is the profile value for the c-th candidate ablation position and the j-th time interval of the treatment and N denotes the number of time intervals of the treatment. The derivatives of the constraint function are calculated in a discretized form as known to the person skilled in the art. In order to evaluate the derivatives of the constraint function with respect to the profile values, all profile values associated with the non-selected ablation positions are set to a predefined value. This value may particularly be zero in order to facilitate the evaluation. Moreover, the profile values associated with ablation positions which have already been selected before are set to their previously determined optimized values.

In the next step 605, the selection unit 407 checks whether at least one of the sums qc of negative derivatives of the constraint function determined in the aforementioned way is smaller than zero. This will be the case if at least one of the evaluated derivatives of the constraint function is negative. If this is not the case, the procedure stops in step 611. If the preceding iteration step bas not lead to an acceptable treatment plan, the optimization may be newly initiated on the basis of a modified optimization problem. The modification may include a change of the weights of the individual constraint functions, for example.

If the check in step 605 is affirmative, the selection unit 407 compares all calculated sums $q_c$ and determines the sum $q_c$ having the smallest (i.e., the most negative) value in step 606. As a result of the comparison, the selection unit 407 selects the candidate ablation position for which the smallest sum $q_c$ has been calculated as a new ablation position to be used during the treatment. This ablation position is then indicated to the optimization unit 408. In such a manner, it is generally possible to select an ablation position suitable for achieving the prescribed treatment goals.

In alternative implementations, the selection unit 407 may not only select one new ablation position but a predetermined number of several ablation positions associated with the smallest sums $q_c$. This implementation reduces the number of iteration steps required for selecting a larger number of ablation positions. However, it may lead to less accurate results.

In an alternative embodiment of the selection stage, the selection unit 407 selects a new insertion point from the available candidate insertion points and then selects the new ablation positions from the set of candidate ablation positions associated with the selected insertion point. This embodiment may particularly be applied in case several candidate ablation positions are associated with each of the candidate insertion points.

In order to select a new insertion point in this embodiment, the selection unit 407 may calculate for each candidate insertion point, a sum of negative derivatives of the constraint function with respect to the profile values for the non-selected ablation positions associated with the respective insertion point. Then, the calculated sums are compared and the candidate insertion point is selected, for which the most negative sum has been calculated. In the next step, the selection unit 407 selects a new ablation position from the non-selected candidate ablation positions associated with the selected insertion point. For this purpose, the selection unit 407 may calculate for each of these candidate ablation positions, a sum of negative derivatives of the constraint function with respect to the profile values for these ablation positions. Thereupon, the sums are compared and the one or more ablation position(s) are selected, for which the most negative sums have been calculated. In order to evaluate the derivatives of the constraint function with respect to the profile values, all profile values associated with non-selected ablation positions may again be set zero or to another predefined value and the profile values associated with already selected ablation positions may be set to their previously determined optimized values.

Compared with the previously explained embodiment of the selection stage, this embodiment involves a higher computational complexity because at least some derivatives—namely those associated with the selected insertion point—appear in two sums. In contrast, each derivative only appears in one sum to be calculated. Therefore, the previously explained embodiment allows for a more efficient selection of an ablation position. Moreover, these embodiments generally allow for more achieving more accurate results. This is particularly true when one ablation position associated with a particularly insertion point is a "good" position (in the sense that it is associated with a relatively small sum of derivatives of the constraint function with respect to the profile values associated with this position), while a greater number of ablation positions associated with this insertion point is suboptimal (so that they are associated with a larger sums of derivatives of the constraint function with respect to the profile values associated with these positions). In this situation, the "good" position might not be selected in the second embodiment described above, while it would be selected in the first embodiment. The optimization stage of each iteration steps starts in step 607, in which the optimization unit 408 receives the newly selected ablation position(s) in order to determine optimized profile values particularly for these ablation positions. However, the optimization unit 408 does preferably not determine optimized profile values for the newly selected ablation position(s) alone. Rather, the optimization unit 408 may determine optimized profile values for all previously selected ablation positions—including the ablation position selected in the current step of the iteration procedure and the ablation positions selected before—in each step of the iteration procedure. Hereby, account can be taken of the fact that the profile values necessary for achieving a certain radiation dose distribution mutually influence each other.

In order to determine the optimized profile values for the selected ablation positions, the optimization unit 408 processes a version of the constraint function in which the profile values of the selected ablation positions are variable (as they correspond to the parameters to be optimized) and in which the profile values associated with the non-selected ablation positions are set to zero (this corresponds to a situation in which no ablation is performed from these positions).

This version of the constraint function is approximately minimized in the optimization unit 408 in step 608. Thus, the optimization unit 12 determines the dwelling positions associated with the selected catheter positions, which approximately minimize the relevant version of the constraint function. For this purpose, the optimization unit 408 may apply to any suitable numerical procedure known the person skilled in the art.

Upon having determined the optimized profile values, the optimization unit 408 may estimate the temperature distributions in the time intervals of the treatment or the thermal dose distribution that is achieved when using the selected ablation positions and optimized profile values during the treatment, depending on whether the treatment goals specify requirements for the temperature distributions or the thermal dose distribution. Then, it may be checked in step 609 whether the temperature distributions or the thermal dose distribution fulfill(s) the prescribed treatment goals such that the optimization result can be accepted. This may be done by the optimization unit 408 in an automatic procedure. As an alternative, the estimated temperature distributions or thermal distribution, may be presented to the user of the planning unit 405 and the user may accept or reject the optimization result. The result may be rejected, if the treatment goals are not sufficiently fulfilled and/or if it is likely that the result can be improved in a further iteration step.

If the result of the optimization stage is not accepted, the planning unit 405 may perform a further step of the iterative procedure to select a further ablation position and determine optimized profile values for this ablation position and the previously selected ablation positions as described above.

If the result of the optimization stage is accepted in one iteration step, the planning unit 405 generates the treatment plan on the basis of the selected ablation positions and the associated optimized profile values in step 610. Thereupon, the thermal ablation treatment may be delivered on the basis of the generated treatment plan.

In the aforementioned way, it is possible to generate a treatment plan for a thermal ablation treatment "offline" prior to the treatment. In addition, the described procedure can be applied with slight modifications to re-optimize ablation positions and profile values in case the position of an already inserted ablation probe 403a,b,c deviates from the planned position. The re-optimization procedure is preferably carried out in real time.

In a related embodiment, the inserted ablation probes 403a,b,c are tracked using the tracking unit 404 and, for each determined position of an ablation probe 403a,b,c it is checked whether it corresponds to the planned position. If it is determined that the position of an ablation probe 403a,b,c deviates from the planned position by more than a predetermined amount, a re-planning procedure may be carried out in the planning unit 405 in order to re-optimize the positions of the following catheters and the associated dwelling times.

In this procedure, the constraint function generation unit 406 generates a version of the constraint function based on the ablation positions detected by means of the tracking unit 404. On the basis of this version of the constraint function, an optimization procedure is carried out in a similar way as explained above. The procedure is initiated starting with the detected ablation positions as already selected ablation positions. In the procedure, the selection unit 407 then selects one or more further ablation positions from a set of candidate ablation positions as explained above. Moreover, the optimization unit 408 determines optimized profile values for the newly selected ablation positions and preferably also for the detected ablation positions. The set of candidate ablation positions used in this procedure preferably no longer includes the candidate ablation positions corresponding to the detected ablation positions.

In the aforementioned way, optimized ablation positions and profiles are determined for a thermal ablation treatment. It is noted that the procedure described above is carried out on the basis of a given number of time intervals of the treatment and, thus, on the basis of a given total treatment time. In a variant of the procedure, the total treatment time is also determined in an optimization process. In this process, optimized ablation positions and profiles are determined on the basis of a first number of time intervals, which is not too small. Then, an iterative process is carried out, on the basis of the optimized ablation positions, where in each step of the process one further time interval is added and optimized profiles for the ablation positions are calculated. The procedure may be stopped when a stopping criterion is fulfilled. Exemplary criteria include that a maximum total treatment time is reached, that relative change of the determined minimum of the constraint function between two steps is smaller than a related threshold and that the relative change of the profile values between two steps is smaller than a related threshold.

Other variations to the disclosed embodiments can be understood and effected by those skilled in the art in practicing the claimed invention, from a study of the drawings, the disclosure and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention claimed is:

1. A system for assisting in planning a focal therapy treatment of a structure within a patient body by applying a treatment quantity to a body region including the structure using one or more devices
   the one or more devices being operated within the patient body in one or more device positions and in accordance with treatment parameters associated with the one or more device positions, each device position being reached via an associated insertion point into the patient body,
   wherein the system comprises:
   a constraint function generation unit configured to generate a constraint function representing clinical objectives relating to the treatment quantity, the constraint function depending upon at least one associated treatment parameter of each candidate device position of a set of candidate device positions associated with different insertion points,
   a selection unit configured to determine, for each of at least some non-selected candidate device positions of the set, a sum of negative derivatives of the constraint function with respect to the treatment parameter associated with the respective device position and to select a device position for use in the treatment from the set of candidate device positions based on a comparison of the determined sums, and an optimization unit configured to determine at least one optimized treatment parameter for the selected device position based on the constraint function.

2. The system as defined in claim 1, wherein the selection unit is configured to determine a sum of negative derivatives for each non-selected candidate device position of the set of candidate device positions and to select a device position based on a comparison of all determined sums.

3. The system as defined in claim 2, wherein the set of candidate device positions includes only one device position for each of a set of predetermined insertion points into the patient body.

4. The system as defined in claim 3, wherein the one or more devices are inserted into the patient body via a template grid comprising a pattern of insertion holes.

5. The system as defined in claim 2, wherein the set of candidate device positions includes several device positions for each of a set of predetermined insertion points.

6. The system as defined in claim 1, wherein the system is configured to control the selection unit and the optimization unit to select several device positions and determine optimized treatment parameters associated with these device positions in an iterative procedure comprising a plurality of steps.

7. The system as defined in claim 5, wherein the selection unit is configured to select a new device position in each step of the iterative procedure by evaluating the derivatives of the constraint function on the basis of previously determined optimized treatment parameters associated with previously selected device positions.

8. The system as defined in claim 6, wherein the optimization unit is configured to determine optimized treatment parameters for all selected device positions in each step of the iterative procedure, including treatment parameters for the device position selected in the respective step and in previous steps of the iterative procedure.

9. The system as defined in claim 1, wherein the system is configured to obtain a position of at least one device already inserted into the patient body and wherein the constraint function generation unit is configured to generate the constraint function based on an estimated amount of the treatment quantity applied to the body region by the at least one already inserted device operated in the obtained position in accordance with associated treatment parameters.

10. The system as defined in claim 1, wherein the focal therapy treatment includes a thermal ablation treatment, the one or more devices are thermal ablation probes, the treatment quantity corresponds to a temperature or a thermal dose, and the treatment parameters relating to a device position of a thermal ablation probe specify values of at least one operation parameter to be used for operating the thermal ablation probe in different time intervals during the thermal ablation treatment.

11. The system as defined in claim 10, wherein the constraint function generation unit is configured to generate a constraint function representing clinical requirements relating to temperature distributions in the body region in each of the time intervals, the constraint function comprising a weighted sum of further constraint functions, each further constraint function representing clinical requirements relating to the temperature distribution in the body region in one of the time intervals and comprising a weighted sum of individual constraint functions, each individual constraint function representing one clinical requirement relating to the temperature distribution in the respective time interval.

12. The system as defined in claim 10, wherein the selection unit is configured to determine, for each of the at least some non-selected candidate device positions, a sum of negative derivatives of the constraint function with respect to the operation parameters associated with the respective device positions over all time intervals.

13. A method for assisting in planning a focal therapy treatment of a structure within a patient body by applying a treatment quantity to a body region including the structure using one or more devices, the one or more devices being operated within the patient body in one or more device positions and in accordance with treatment parameters associated with the one or more device positions, each device position being reached via an associated insertion point into the patient body, wherein the method comprises:

generating a constraint function representing clinical requirements relating to the treatment quantity, the constraint function depending upon at least one associated treatment parameter of each candidate device position of a set of candidate device positions associated with different insertion points, determining, for each of at least some non-selected candidate device positions of the set, a sum of negative derivatives of the constraint function with respect to the treatment parameter associated with the respective device position and to select a device position for use in the treatment from the set of candidate device positions based on a comparison of the determined sums, and determining at least one optimized treatment parameter for the selected device position based the constraint function.

14. A non-transitory computer readable medium comprising an executable code for executing the method of claim 13, when executed by a processor of a computer device.

15. The method of claim 13, further comprising:

determining a sum of negative derivatives for each non-selected candidate device position of the set of candidate device positions, and selecting a device position based on a comparison of all determined sums.

16. The method of claim 15, wherein the set of candidate device positions includes only one device position for each of a set of predetermined insertion points into the patient body.

17. The method of claim 16, wherein the one or more devices are inserted into the patient body via a template grid comprising a pattern of insertion holes.

18. The method of claim 15, wherein the set of candidate device positions includes several device positions for each of a set of predetermined insertion points.

19. The method of claim 13, further comprising:

controlling selection of several device positions, and determining optimized treatment parameters associated with these device positions in an iterative procedure.

20. The method of claim 18, further comprising:

selecting a new device position in the iterative procedure by evaluating the derivatives of the constraint function on the basis of previously determined optimized treatment parameters associated with previously selected device positions.

* * * * *